July 15, 1952   P. B. MELLINGER ET AL   2,603,056
POLE SUPPORTED FRUIT GATHERER
Filed March 23, 1949

Inventor
PAUL B. MELLINGER
MAURICE E. LEHMAN

Patented July 15, 1952

2,603,056

UNITED STATES PATENT OFFICE 2,603,056

POLE SUPPORTED FRUIT GATHERER

Paul B. Mellinger, Pequea Township, Lancaster County, and Maurice E. Lehman, Manheim Township, Lancaster County, Pa.; said Lehman assignor to said Mellinger Application March 23, 1949, Serial No. 82,937

6 Claims. (Cl. 56—338)

This invention relates to a fruit harvesting device and more particularly to a mechanically operated device which severs the stem of the fruit and conveys the fruit to a suitable receptacle.

In the past it has been common practice to use fruit picking devices in which the severing elements are not continuously operating but are actuated by a rope from the operator standing on a suitable platform, ladder, etc. All of these prior art devices are cumbersome to handle inasmuch as the operator must use one hand to pull the rope or actuate some other manually operated mechanism to sever the stem of the fruit. The harvesting of fruit with a device of this type is a slow burdensome task.

In order to overcome the disadvantages of the prior art machines we have developed a device which is continuously operated mechanically, is light in weight and can be easily and rapidly manipulated by the operator.

It is an object of this invention to provide a device which may be continuously mechanically operated and which severs the stem of the fruit by the shearing action of a mechanically operated cutter bar.

Another object of this invention is to provide a portable fruit picker which is light in weight and can be easily and rapidly manipulated by an operator.

In order that our invention may be more readily understood it will be described in connection with the attached drawing in which.

Figure 1:
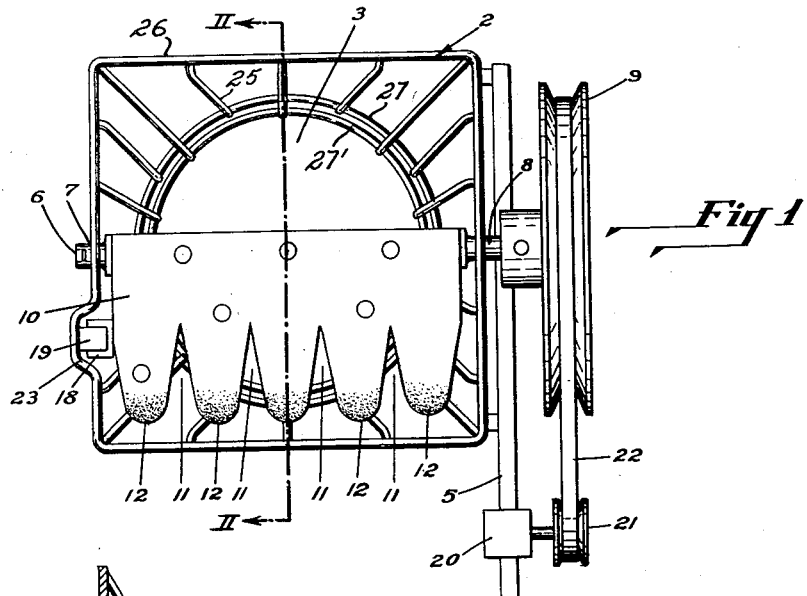
Figure 1 is a top view of the device of our invention.

Referring to Fig. 1 there is shown a wire basket 2 or other suitable receptacle. The wire basket 2 is preferably made of a plurality of wire strands 25 extending from the metal band 26 in a direction substantially normal to the metal band 26 at the top of the basket to a pair of metal bands 27 and 27' at the bottom of the basket. The front of the wire basket is provided with an upstanding projection 28 for the purpose of pushing aside the foliage to enable the device to be used effectively on the fruit. The shape of the wire basket 2 is such that fruit dropping therein will be directed to the center of the bottom portion where there is located an opening 3 through which the fruit passes into a suitable conveying tube 4 to convey it to a suitable receptacle located on the ground or on a platform. The conveying tube 4 is provided with a series of restrictions 4' which prevent the rapid descent of the fruit to avoid bruising. These restrictions 4' are preferably in the form of a rubber ring in the shape of an inverted frustrum, with an edge secured to the side wall of the tube 4.

The basket or receptacle 2 is secured on a handle 5 which is preferably attached to the front top corner of the basket and to the rear bottom corner of the basket in such manner that the handle passes across the one end of the basket. This arrangement makes it possible for the operator to stand beneath and to the rear of the device so that in operation, the operator is able to see over the device to properly guide it to the fruit to be harvested.

Figure 2:
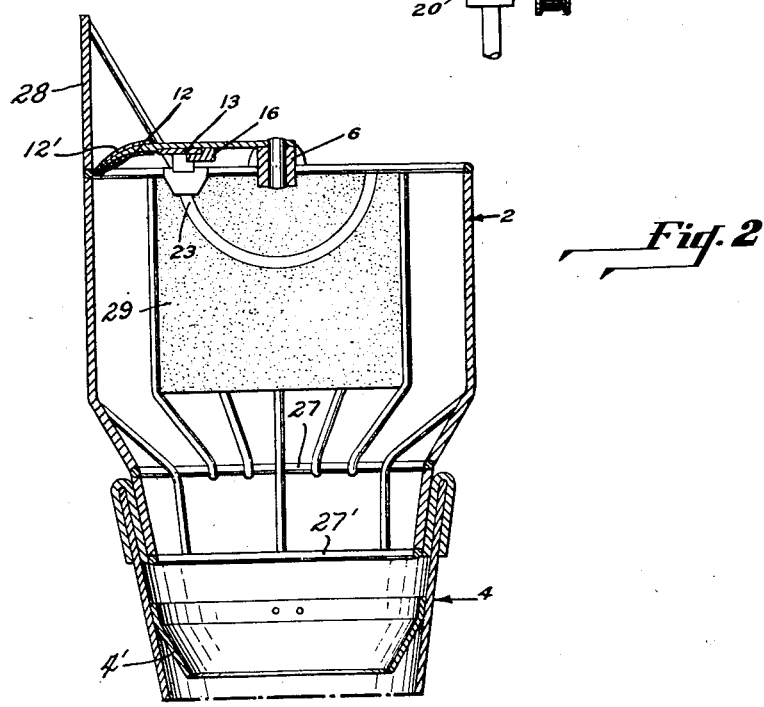
Figure 2 is a cross-sectional view taken on the line II—II of Figure 1.
Figure 3:
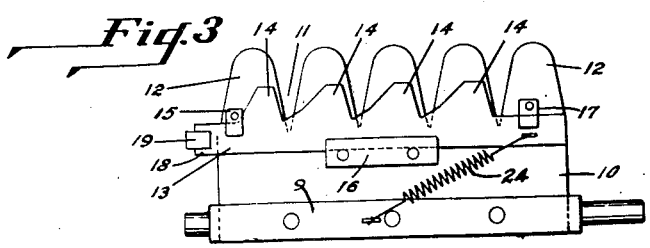
Figure 3 is a detailed view of the underneath side of the cutter bar.

Rotatably mounted across the top center portion of the basket 2 is a shaft 6 which is journalled in bearings 7 and 8 on the sides of the basket. The shaft passes through the bearing 8 on the one side. Secured to the end of shaft 6 is a pulley 9. A serrated plate or guide 10 is riveted to the rotatable shaft 6 in such position that the serrated edge of the plate is disposed away from the shaft. This serrated plate may have any number of serrations depending on the type of fruit for which the device is to be used. On the device illustrated in the drawing the plate 10 is provided with four serrations 11 forming five fingers 12. It will be understood of course that the number of fingers and serrations may be varied depending on the type of fruit being harvested. The fingers 12 are rounded at their ends so that the stem of the fruit will be guided into the serration between two of the fingers. The fingers may be straight or curved as shown in Fig. 2 of the drawing depending on the foliage and other factors.

Located on the under side of the plate 10 is a slidable cutter bar 13 provided with cutter blades 14, one blade 14 being provided for each serration 11. The cutter bar 13 is slidably attached to the plate 10 by means of keepers 15, 16 and 17 which are riveted or otherwise secured to the plate 10. One end of the cutter bar 13 is provided with a bifurcated projection 18 which carries a cam follower 19.

Mounted on the handle 5 in close proximity to the basket 2 is a motor 20 having a pulley 21. The pulley 21 drives belt 22 which in turn rotates the pulley 9 attached to shaft 6. It will be clear from this disclosure that the operation of the motor 20 rotates shaft 6 carrying with it plate 10 and the cutter bar 13.

The belt drive illustrated and described herein is given as a typical example of a suitable drive.

As the shaft 6 rotates, the cam roller 19 during a portion of the cycle of rotation of the shaft engages a plate 29 having a cam-track guide 23 located on the side of the basket 2. The plate 29 is secured by any conventional means. The cam at the point at which the cam roller first engages it is flared outwardly so that the cutter bar will move across the serrated plate in such a manner that the blade 14 will sever the stem disposed in the serrations 11. After the cam roller 19 no longer is in engagement with the cam the cutter bar is returned to its original position by means of a coil spring 24 which is placed under tension by the action of the cam moving the cutter bar across the serrated plate. The speed of rotation of the device may be varied depending on the particular type fruit being harvested. We have found that for most purposes a speed of approximately 20 R. P. M. is satisfactory.

In some instances, depending upon the type of fruit being harvested, it may be found desirable to coat the tips of the fingers 12 with a resilient material such as rubber to prevent the fruit from being bruised by the fingers. If desired, the wire strands of the basket may also be rubber coated. This coating is shown at 12' on Figure 2.

The motor used to operate the device may be of any of the conventional types such as electric, hydraulic, air, etc. The motor is preferably placed in close proximity to the pulley 9 and the motor energizing means is carried up through the hollow handle.

In the operation of our device, the handle 5 is grasped by the operator and the basket 2 is guided to engage the fruit to be harvested. The motor 20 operates the belt 22 which in turn rotates pulley 9. Pulley 9 being attached to shaft 6 rotates the same in bearings 7 and 8. Inasmuch as the serrated plate 10 is riveted to the shaft 6, rotation of the shaft causes plate 10 to revolve about the axis of the shaft 6. The plate 10 as shown in Fig. 2 revolves in a counter-clockwise direction.

As the plate 10 is revolved in the vicinity of the fruit on a tree the fingers 12 contact the stem of the fruit. As the ends of the fingers are rounded, the motion imparted to the plate causes the stem of the fruit to move into a serration 11 between the fingers 12. Continued movement of the serrated plate causes the cam roller 19 to engage cam surface 23, moving the cutter bar 13 in a horizontal direction. Cutter bar 13 is held in sliding engagement against the bottom surface of the serrated plate 10 by means of keepers 15, 16 and 17. Inasmuch as the stem of the fruit is lodged in the serration between the fingers of the plate 10, the sliding cutter bar shears the stem and the fruit drops into the basket 2 for delivery through the tubular conveyor to a suitable receptacle.

The horizontal movement of the cutter bar 13 places spring 24 under tension since one end thereof is attached to the cutter bar and the other end is attached to plate 10. The cam roller 19 remains in contact with the cam surface 23 for approximately one-half revolution of the shaft 6. After the cam roller no longer engages the cam surface 23 the spring 24 returns the cutter bar 13 to its original position.

The speed of rotation of the device may be varied depending on the type of fruit being harvested. In most cases a speed of 20 R. P. M. is satisfactory for the operation of our device.

It will be clear from the foregoing that we have developed a fruit harvester which is simple to operate, light in weight, and easy to handle inasmuch as it requires no manually operated means for actuating the cutting device.

While we have illustrated and described a preferred embodiment of our invention, it will be understood that the same is not so limited but may be otherwise practiced within the scope of the following claims.

We claim:

1. In a portable fruit harvester, a receptacle to receive fruit, a shaft rotatably mounted across the top of said receptacle, a plurality of tapered fingers secured to said shaft and rotatable therewith; a cutter bar having cutter blades slidably attached to said fingers, said blades being in register with the notches between the fingers, means operatively connected to said shaft for rotating said shaft and fingers, and means on the side of the receptacle for actuating said cutter bar to move the cutter blades across the notches between the fingers.

2. In a portable fruit harvester, a receptacle to receive fruit, a shaft rotatably mounted across the top of said receptacle, a serrated plate secured to said shaft and rotatable therewith; a cutter bar having cutter blades slidably attached to said serrated plate, said blades being in register with the serrations in the plate, means operatively connected to said shaft for rotating said shaft and serrated plate, and means on the side of the receptacle for actuating said cutter bar to move the cutter blades across the serrations in the plate.

3. In a portable fruit harvester, a receptacle to receive fruit, a shaft rotatably mounted across the top of said receptacle, a plurality of tapered fingers secured to said shaft and rotatable therewith; a cutter bar having cutter blades slidably attached to said fingers, said blades being in register with the notches between the fingers, means operatively connected to said shaft for rotating said shaft and fingers, and means operatively associated with said cutter bar for actuating said cutter bar to move the cutter blades across the notches between the fingers.

4. In a portable fruit harvester, a receptacle to receive fruit, a shaft rotatably mounted across the top of said receptacle, a plurality of tapered fingers secured to said shaft and rotatable therewith; a cutter bar having cutter blades slidably attached to said fingers, said blades being in register with the notches between the fingers, means operatively connected to said shaft for rotating said shaft and fingers, a cam roller on one end of said cutter bar, a cam on the side of said receptacle for engagement with the cam roller to actuate the cutter bar, and spring means to return the cutter bar when the cam roller is not in engagement with said cam.

5. In a portable fruit harvester, a receptacle to receive fruit, a shaft rotatably mounted across the top of said receptacle, a plurality of tapered fingers secured to said shaft and rotatable therewith, the ends of said fingers being coated with a resilient material; a cutter bar having cutter blades slidably attached to said fingers, said blades being in register with the notches between the fingers, means operatively connected to said shaft for rotating said shaft and fingers, and means on the side of the receptacle for actuating said cutter bar to move the cutter blades across the notches between the fingers.

6. In a portable fruit harvester, a receptacle to receive fruit, a shaft rotatably mounted across the top of said receptacle, a plurality of tapered fingers secured to said shaft and rotatable therewith; the ends of said fingers being curved, a cutter bar having cutter blades slidably attached to said fingers said blades being in register with the notches therebetween, means operatively connected to said shaft for rotating said shaft and fingers, and means on the side of the receptacle for actuating said cutter bar to move the cutter blades across the notches between the fingers.

PAUL B. MELLINGER.
MAURICE E. LEHMAN.

REFERENCES CITED

The following references are of record in the file of this patent:

UNITED STATES PATENTS

| Number | Name | Date |
|---|---|---|
| 1,376,338 | Hyson | Apr. 26, 1921 |
| 1,670,796 | Boerig | May 22, 1928 |
| 2,346,986 | Metzger | Apr. 18, 1944 |

FOREIGN PATENTS

| Number | Country | Date |
|---|---|---|
| 44,142 | Denmark | May 18, 1931 |